United States Patent
Strohmayer

(10) Patent No.: US 7,857,040 B1
(45) Date of Patent: Dec. 28, 2010

(54) HEAT EXCHANGER FOR AIRCRAFT EXHAUST

(75) Inventor: Thomas J. Strohmayer, Daytona Beach, FL (US)

(73) Assignee: Power Flow Systems, Inc., Daytona Beach, FL (US)

( * ) Notice: Subject to any disclaimer, the term of this patent is extended or adjusted under 35 U.S.C. 154(b) by 781 days.

(21) Appl. No.: 11/899,202

(22) Filed: Sep. 5, 2007

(51) Int. Cl.
*F28D 7/02* (2006.01)
*F28F 9/22* (2006.01)

(52) U.S. Cl. .................................. 165/163; 165/159
(58) Field of Classification Search .............. 165/163, 165/157, 159, 160, 161, 52, 56, 57, 58; 126/110 R, 126/99 R
See application file for complete search history.

(56) References Cited

U.S. PATENT DOCUMENTS

| | | | | |
|---|---|---|---|---|
| 525,552 A | * | 9/1894 | Keasbey | 165/161 |
| 1,841,528 A | * | 1/1932 | Gebhardt | 165/96 |
| 2,279,552 A | * | 4/1942 | Bowman | 165/158 |
| 2,395,417 A | * | 2/1946 | McCollum | 126/110 R |
| 2,877,000 A | * | 3/1959 | Person | 165/159 |
| 4,235,081 A | * | 11/1980 | Dowling | 62/93 |
| 4,706,646 A | * | 11/1987 | Christianson et al. | 126/117 |
| 4,778,005 A | * | 10/1988 | Smith | 165/160 |
| 4,942,743 A | * | 7/1990 | Gregory | 62/503 |

* cited by examiner

*Primary Examiner*—Tho V Duong
(74) *Attorney, Agent, or Firm*—Paul S. Rooy PA

(57) ABSTRACT

A heat exchanger for use with exhaust pipes. A shroud inlet communicates with a rear chamber, which communicates with a front chamber via a center plate vent. The front chamber communicates with a shroud outlet. Ambient air entering the rear chamber is routed around at least one J-pipe in the rear chamber, and around a collector in the front chamber, thus being twice heated prior to exiting the heat exchanger through the shroud outlet. The double heating provided by this design increases the efficiency of the heat exchanger. The collector is attached to the center plate by means of a full-penetration fillet weld, and the J-pipes are attached to the center plate, a front plate, and a pipe assembly baffle by stitch welding external to the J-pipes, thus strengthening the integrity of the hermetic seal between exhaust gasses and ambient air passing through the heat exchanger.

20 Claims, 3 Drawing Sheets

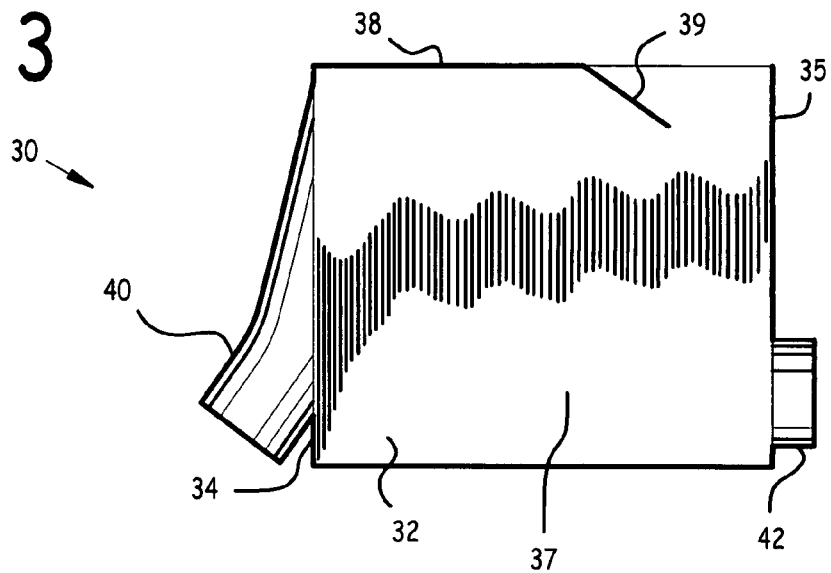
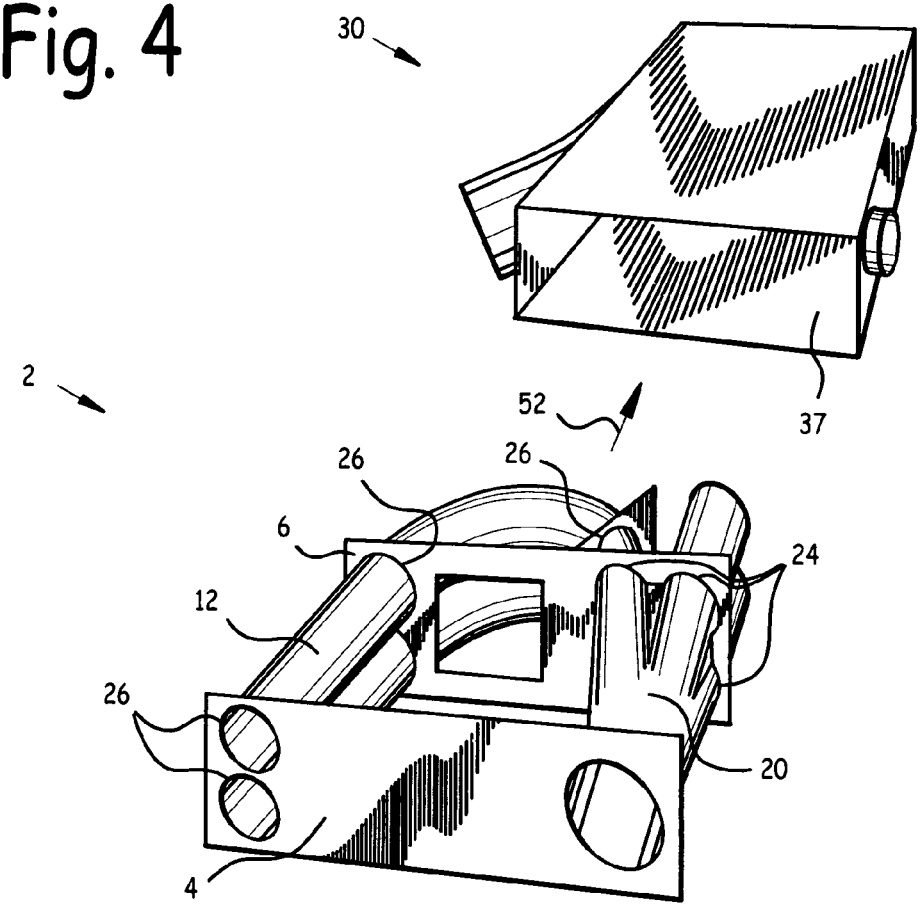

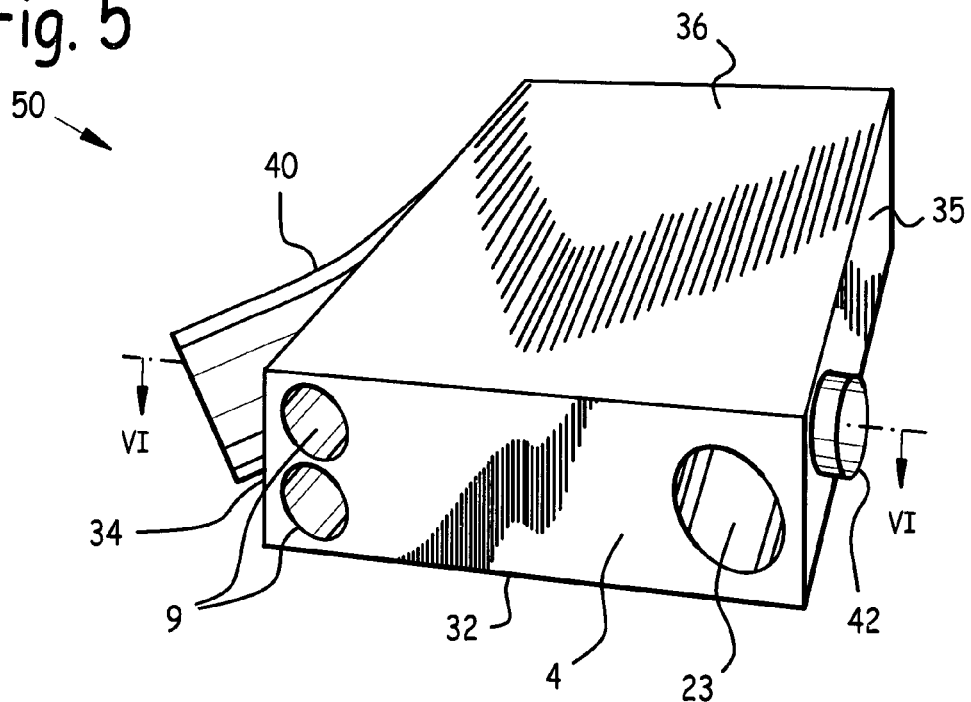
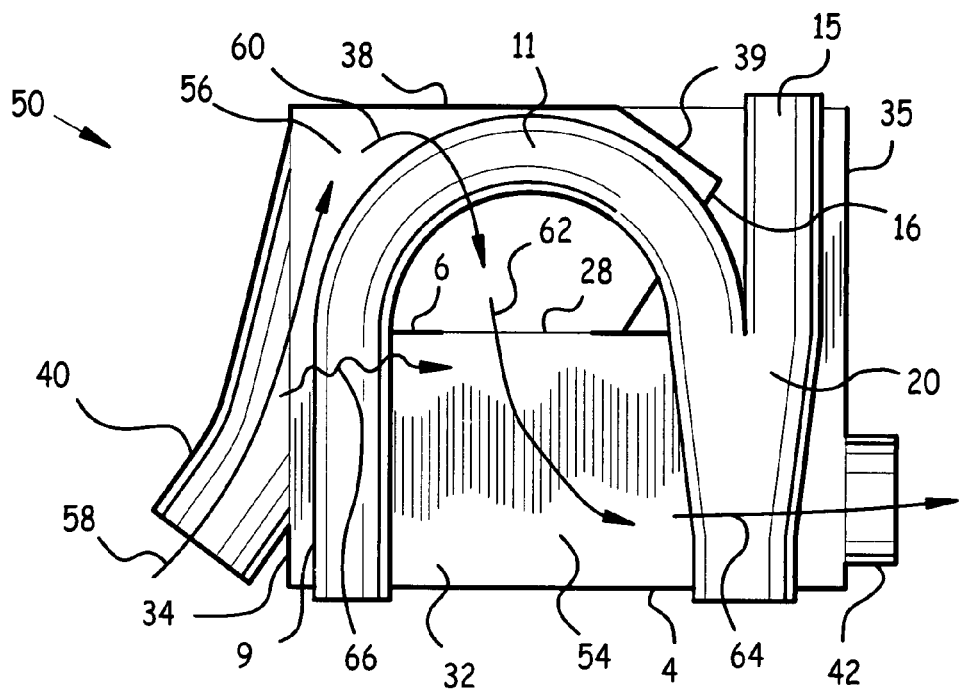

US 7,857,040 B1

HEAT EXCHANGER FOR AIRCRAFT EXHAUST

BACKGROUND OF THE INVENTION

1. Field of the Invention

This invention relates to aircraft heating systems, and in particular to a heat exchanger for aircraft exhaust.

2. Background of the Invention

Heating systems for aircraft frequently take exhaust heat from the exhaust pipes of an aircraft by means of a heat exchanger, and transfer the heat into the cabin of the aircraft via ambient air through ducts. Aircraft heating may be necessitated by the colder temperatures of higher altitudes, and also winter flight frequently mandates the use of aircraft cabin heat.

A typical aircraft heating system which uses exhaust gas heat from the aircraft engine generally involves a heat exchanger having a heat shroud around one or more exhaust pipes, whose heat shroud inlet takes in ambient air from the atmosphere. This ambient air is heated while it circulates through the heat exchanger, and then the heated air departs the heat shroud through a heat shroud exit, and from there flows into the aircraft cabin to heat the cabin. A valve is generally provided which regulates how much heated air is allowed to flow into the cabin, and thus controls the cabin temperature.

Exhaust heater shrouds must be sturdily built to withstand the vibrations of an aircraft exhaust, and also be reasonably air-tight, to prevent loss of heated air. It is also important to preserve the air-tightness of the exhaust pipes passing through the heater exhaust shroud. If an exhaust pipe were to leak carbon monoxide, carbon dioxide, and other exhaust oxygen-poor gasses into the exhaust shroud, these gasses could wind up in the cabin, and could cause asphyxiation of the occupant(s). One way to help preserve the integrity of exhaust pipes within the shroud is to keep welds to a minimum within the heat exchanger, and only use full-penetration fillet welds and stitch welds external to the exhaust pipes within the heat exchanger itself.

Another design objective in exhaust heater shrouds for aircraft is the maximization of contact between ambient air flowing through the shroud to be heated, and the hot exhaust pipes and collector. The more contact between fresh air flowing through the shroud to be heated and the hot exhaust pipes, the more efficient the exhaust heater shroud. One existing design provides J-pipes and straight pipes feeding into a collector, all encased in a shroud through which ambient air flows, but this design does not provide a serpentine path to maximize heating.

Thus, it would be desirable to provide a heat exchanger for aircraft exhaust which maximizes the contact between fresh air flowing through the shroud and the hot exhaust pipes. It would also be desirable to provide a heat exchanger for aircraft exhaust which keeps welds to a minimum within the shroud, and only uses full-penetration fillet welds and stitch welds external to the exhaust pipes within the shroud.

SUMMARY OF THE INVENTION

Accordingly, it is an object of the present invention to provide a heat exchanger for aircraft exhaust which provides for the maximization of contact between fresh air to be heated flowing through the shroud, and the hot exhaust pipes. Design features allowing this object to be accomplished include a shroud encasing a pipe assembly, a center plate having a center plate vent, and the resulting serpentine air pathway. Advantages associated with the accomplishment of this object include more efficient heating, and the ability to maintain a comfortable cabin temperature at higher altitudes.

It is another object of the present invention to provide a heat exchanger for aircraft exhaust which keep welds to a minimum within the heat exchange section, and only uses full-penetration fillet welds and stitch welds external to the exhaust pipes within the heat exchange section itself. Design features allowing this object to be accomplished include a full-penetration weld between a center plate and a collector, and stitch weld attachments between J-pipes and a front plate, center plate, and pipe assembly baffle. A benefit associated with the accomplishment of this object is increased strength in the heat exchanger, and consequent greater longevity.

It is yet another object of this invention to provide a heat exchanger for aircraft exhaust which is economical to build. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIGS. 1 and 2. Sheet two contains FIGS. 3 and 4. Sheet three contains FIGS. 5 and 6.

FIG. 3 is a top cross-sectional view of a shroud taken at section III-III of FIG. 2.

FIG. 4 is a front elevated isometric view of a pipe assembly about to be installed in a shroud.

FIG. 5 is a front elevated isometric view of an assembled heat exchanger.

FIG. 6 is a top cross-sectional view of a heat exchanger taken at section VI-VI of FIG. 5.

DETAILED DESCRIPTION OF THE PREFERRED EMBODIMENT

Figure 1:
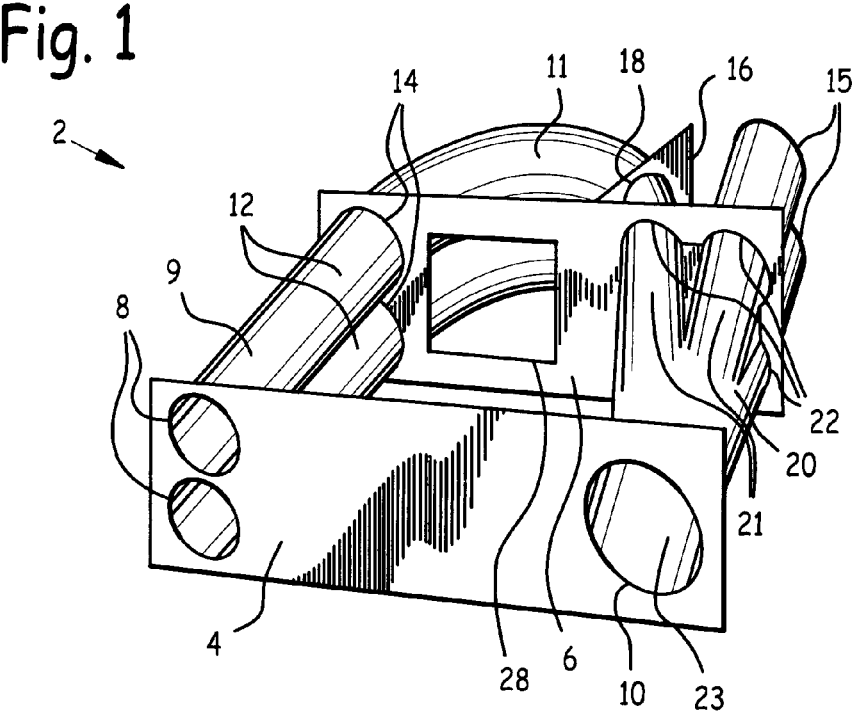
FIG. 1 is a front elevated isometric view of a pipe assembly.

FIG. 1 is a front elevated isometric view of pipe assembly 2. The figures depict a four-cylinder engine heat exchanger for illustrative purposes; the instant heat exchanger may be used in engines of different configurations (e.g. two-cylinder, six-cylinder, eight-cylinder, etc.) merely by adding or subtracting J-pipes 12 and/or straight pipes 15. Such differing numbers of J-pipes 12 and/or straight pipes 15 are intended to fall within the scope of this disclosure.

For illustrative purposes, the following discussion will describe the four-cylinder embodiment depicted in the drawings. The instant disclosure follows the conventions that the front of heat exchanger 50 is at front plate 4; the rear of heat exchanger 50 is at shroud back plate 38; the left side of heat exchanger 50 is at shroud left wall 34; the right side of heat exchanger 50 is at shroud right wall 35.

Heat exchanger 50 comprises pipe assembly 2 installed in shroud 30 as depicted in FIGS. 4-6. Pipe assembly 2 comprises at least one J-pipe 12 and at least one straight pipe 15, which collectively are attached to, and feed into, collector 20. Collector 20 comprises a collector leg 21 corresponding to each pipe feeding into it, and collector outlet 23 communicating with collector legs 21.

Pipe assembly 2 further comprises front plate 4 and center plate 6. In the preferred embodiment, front plate 4 was substantially parallel to center plate 6. Front plate 4 comprises a front plate J-pipe aperture 8 corresponding to each J-pipe 12, and a front plate collector aperture 10 sized to admit collector outlet 23. Center plate 6 comprises a center plate J-pipe aperture 14 corresponding to each J-pipe 12, and a center plate collector aperture 22 sized to admit collector 20 where collector legs 21 join collector outlet 23. Center plate 6 also comprises center plate vent 28, which serves to direct ambient air in a serpentine path past J-pipe(s) 12 and collector 20 en route to shroud outlet 42, thus maximizing the efficiency of heat exchanger 50.

Collector 20 extends through, and is attached to, center plate collector aperture 22 in the area where collector legs 21 join collector outlet 23. Collector outlet 23 extends through, and is attached to, collector aperture 10, which is sized to slidably admit collector outlet 23. J-pipe 12 comprises J-pipe leg 9 communicating with J-pipe hook 11. The end of J-pipe hook 11 opposite J-pipe leg 9 is attached to and communicates with a corresponding collector leg 21. The end of J-pipe leg 9 opposite J-pipe hook 11 is attached to, and extends through, front plate J-pipe aperture 8.

Pipe assembly 2 further comprises pipe assembly baffle 16 attached to, and extending backwards from, center plate 6. Pipe assembly baffle 16 comprises a pipe assembly baffle J-plate aperture 18 corresponding to each J-pipe 12. Pipe assembly baffle aperture 18 is sized to slidably admit J-pipe hook 11. Each J-pipe hook 11 passes through a corresponding pipe assembly baffle J-plate aperture 18 during its travel from J-pipe leg 9 to collector 20. In the preferred embodiment, pipe assembly baffle 16 was attached to center plate 6 at substantially a 50 degree angle±15 degrees, leaning towards straight pipe(s) 15. The heights of front plate 4, center plate 6, and pipe assembly baffle 16 all substantially equal the height of shroud 30.

Figure 2:
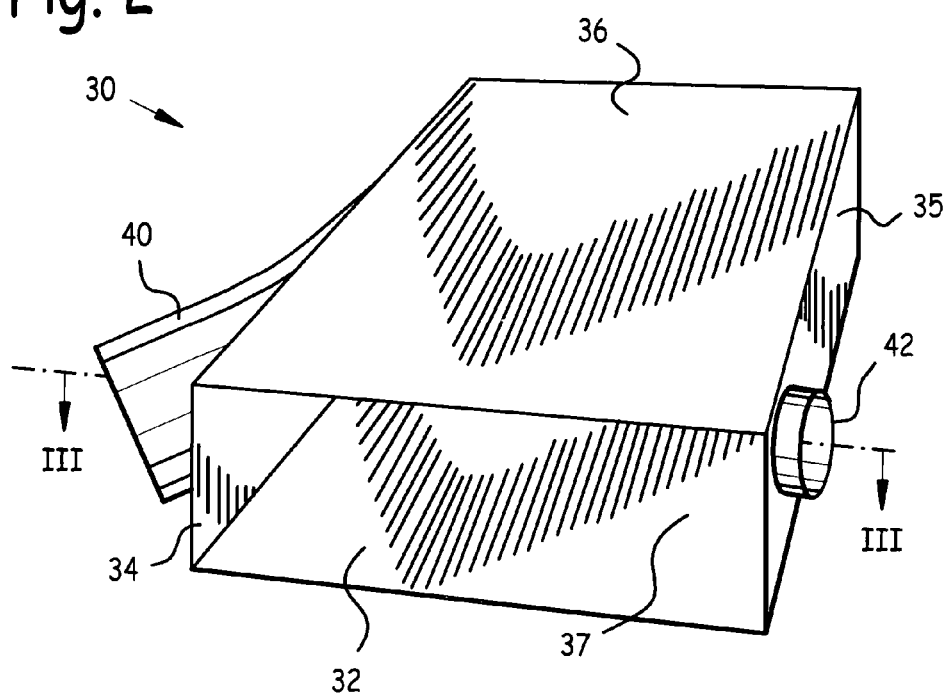
FIG. 2 is a front elevated isometric view of a shroud.

FIG. 2 is a front elevated isometric view of shroud 30. The height of shroud 30 is substantially equal to the heights of front plate 4, center plate 6, and pipe assembly baffle 16; shroud 30 is sized to slidably admit pipe assembly 2 as illustrated in FIG. 4.

Shroud 30 comprises shroud floor 32, shroud left wall 34, shroud right wall 35, and shroud roof 36, which together define shroud void 37. Shroud void 37 is sized to slidably admit pipe assembly 2.

As may be observed in FIG. 3, a top cross-sectional view of a shroud taken at section of FIG. 2, shroud void 37 communicates with the exterior of shroud 30 through shroud inlet 40 in shroud left wall 34, and shroud outlet 42 in shroud right wall 35. Shroud 30 further comprises shroud back plate 38 attached along the rear edges of shroud floor 32, shroud left wall 34, and shroud roof 36. Shroud baffle 39 is attached to an edge of shroud back plate 38 opposite shroud left wall 34. The heights of shroud back plate 38 and shroud baffle 39 are substantially equal to the height of shroud 30 as defined by shroud left wall 34 and shroud right wall 35.

Shroud 30 is sized to slidably admit pipe assembly 2 as illustrated in FIG. 4. FIG. 4 is a front elevated isometric view of pipe assembly 2 about to be installed in shroud void 37, as indicated by arrow 52. During installation, pipe assembly 2 is slid into shroud 30. Then the front edges of shroud floor 32, shroud left wall 34, shroud right wall 35, and shroud roof 36 are attached to the bottom, left, right, and top edges of front plate 4 respectively. The result is heat exchanger 50, depicted in FIGS. 5 and 6.

FIG. 5 is a front elevated isometric view of heat exchanger 50. FIG. 6 is a top cross-sectional view of heat exchanger 50 taken at section VI-VI of FIG. 5.

As may be observed in FIG. 6, the structure of heat exchanger 50 defines front chamber 54 and rear chamber 56. Ambient air is generally routed into heat exchanger 50 through shroud inlet 40 in shroud left wall 34, through rear chamber 56 past J-pipe hook(s) 11, through center plate vent 28 en route to front chamber 54, past heat exchanger 20 in front chamber 54, and finally out of heat exchanger 50 through shroud outlet 42 in shroud right wall 35, as indicated by arrows 58-64.

Front chamber 54 is defined by front plate 4, center plate 6, shroud roof 36, shroud floor 32, shroud left wall 34 and shroud right wall 35. Rear chamber 56 is defined by center plate 6, shroud back plate 38, shroud baffle 39, pipe assembly baffle 16, shroud roof 36, shroud floor 32, and shroud left wall 34. Front chamber 54 communicates with rear chamber 56 through center plate vent 28, and with the exterior via shroud inlet 40 and shroud outlet 42. Rear chamber 56 communicates with an exterior of heat exchanger 50 via shroud inlet 40.

It is intended to fall within the scope of this disclosure that the edge of pipe assembly baffle 16 opposite center plate 6 may be attached directly to shroud back plate 38, thus eliminating shroud baffle 39. This attachment could be facilitated by changing the angle at which pipe assembly baffle 16 is attached to center plate 6, curving pipe assembly baffle 16, etc. In this embodiment, rear chamber 56 is defined by center plate 6, shroud back plate 38, pipe assembly baffle 16, shroud roof 36, shroud floor 32, and shroud left wall 34.

In operation, ram air impinging on an aircraft or other vehicle to which the instant heat exchanger 50 is mounted forces ambient air into heat exchanger 50 through shroud inlet 40 as indicated by arrow 58 in FIG. 6. Ambient air initially enters rear chamber 56 through shroud inlet 40 as indicated by arrow 58. In rear chamber 56, the ambient air passes over J-pipe hook(s) 11 as indicated by arrow 60, thereby heating the ambient air.

From rear chamber 56, ambient air enters front chamber 54 through center plate vent 28, as indicated by arrow 62. In front chamber 54, the ambient air passes over collector 20 as indicated by arrow 64, thus further heating the ambient air, after which the heated ambient air exits heat exchanger 50 through shroud outlet 42, as indicated by arrow 64. The serpentine pathway the instant heat exchanger 50 forces ambient air to take brings the ambient air first into contact with J-pipe(s) 12, and then with collector 20, thus doubly heating the ambient air and increasing the efficiency of the instant heat exchanger 50.

Some ambient air passes over J-pipe leg(s) 9 en route to front chamber 54 as depicted by arrow 66 in FIG. 6. This air is first heated by J-pipe leg(s) 9, and then further heated by collector 20 enroute to shroud outlet 42, as described above.

An important design objective in the instant invention is to keep welds to a minimum within heat exchanger 50, and only use full-penetration fillet welds and stitch welds external to the exhaust pipes within the heat exchanger itself. As may be observed in FIG. 4, design features allowing this object to be accomplished include full-penetration fillet weld 24 between center plate 6 and collector 20, and stitch weld 26 attachments between J-pipes 12 and front plate 4, center plate 6, and pipe assembly baffle 16. A benefit associated with the accomplishment of this object is increased strength in the heat exchanger, and consequent greater longevity.

Another important benefit is safety. It is important to avoid any leakage of exhaust gasses out of J-pipes 12 and collector 20 into the ambient air being heated within front chamber 54 and rear chamber 56, because these exhaust gasses contain poisons such as carbon monoxide, and the air being heated may be used for cabin heating and be breathed in by the vehicle occupants. Within front chamber 54 and rear chamber 56, the instant heat exchanger 50 design provides only stitch welds 26 external to J-pipe(s) 12, and full-penetration fillet weld 24 at the junction of collector 20 and center plate 6. In this manner, the strength of the hermetic seal between exhaust gasses and ambient air is enhanced by the instant invention.

In the preferred embodiment the instant heat exchanger was manufactured of a metal such as stainless steel, or other appropriate materials. Attachments between J-pipe(s) 12 and front plate 4, center plate 6, and pipe assembly baffle 16 were made by stitch welds external to J-pipe(s) 12, or other appropriate means of attachment. The attachment between collector 20 and center plate 6 was made by full-penetration fillet weld, or other appropriate means of attachment.

The rest of the attachments between the components of the instant heat exchanger 50 were made by means of welds, fasteners such as screws, nut plates, and nuts, or other appropriate means of attachment. Attachment flanges and lips through which fasteners may be fastened are old and well-known in the art, are irrelevant to the instant invention, and thus are not depicted in the figures.

J-pipes 12 and straight pipes 15 were each integral, single-piece fabrications. J-pipe 12 was fabricated by bending a straight pipe into a hook shape using conventional pipe-bending methods, or by any other appropriate means.

While a preferred embodiment of the invention has been illustrated herein, it is to be understood that changes and variations may be made by those skilled in the art without departing from the spirit of the appending claims.

DRAWING ITEM INDEX 2 pipe assembly
4 front plate
6 center plate
8 front plate J-pipe aperture
9 J-pipe leg
10 front plate collector aperture
11 J-pipe hook
12 J-pipe
14 center plate J-pipe aperture
15 straight pipe
16 pipe assembly baffle
18 pipe assembly baffle J-plate aperture
20 collector
21 collector leg
22 center plate collector aperture
23 collector outlet
24 full-penetration weld
26 stitch weld
28 center plate vent
30 shroud
32 shroud floor
34 shroud left wall
35 shroud right wall
36 shroud roof
37 shroud void
38 shroud back plate
39 shroud baffle
40 shroud inlet
42 shroud outlet
50 heat exchanger
52 arrow
54 front chamber
56 rear chamber
58 arrow
60 arrow
62 arrow
64 arrow
66 arrow

I claim:

1. A heat exchanger comprising a shroud floor, shroud roof, shroud floor, shroud left wall, shroud right wall, front plate, center plate, and shroud back plate; a front chamber defined by said front plate, said center plate, said shroud roof, said shroud floor, said shroud left wall and said shroud right wall; a rear chamber defined by said center plate, said shroud back plate, a pipe assembly baffle, said shroud roof, said shroud floor, and said shroud left wall; said front chamber communicating with said rear chamber through a center plate vent, and with an exterior of said heat exchanger via a shroud outlet; said rear chamber communicating with an exterior of said heat exchanger via a shroud inlet; at least one J-pipe passing through said front chamber and said rear chamber to a collector, at least one straight pipe attached to and communicating with said collector, said collector passing through said front chamber.

2. The heat exchanger of claim 1 wherein said collector passes through said center plate via a center plate collector aperture sized to admit said collector, and is attached to said center plate by means of a full-penetration fillet weld.

3. The heat exchanger of claim 2 wherein each said J-pipe extends through said front plate via a corresponding front plate J-pipe aperture and is attached to said front plate by means of a stitch weld.

4. The heat exchanger of claim 3 wherein each said J-pipe extends through said center plate via a corresponding center plate J-pipe aperture and is attached to said center plate by means of a stitch weld.

5. The heat exchanger of claim 4 further comprising a shroud baffle attached along one edge to said shroud back plate and along an opposite edge to said pipe assembly baffle, said rear chamber being defined by said center plate, said shroud back plate, said shroud baffle, said pipe assembly baffle, said shroud roof, said shroud floor, and said shroud left wall.

6. The heat exchanger of claim 5 wherein each said J-pipe extends through said pipe assembly baffle via a corresponding pipe assembly baffle J-pipe aperture and is attached to said pipe assembly baffle by means of a stitch weld.

7. The heat exchanger of claim 6 wherein said pipe assembly baffle extends backwards from said center plate at substantially a 50 degree angle±15 degrees.

8. The heat exchanger of claim 5 wherein each said J-pipe comprises a J-pipe leg communicating with and attached to a J-pipe hook, said J-pipe leg extending through said front chamber, said J-pipe hook extending through said rear chamber, said J-pipe hook communicating with and attached to said collector.

9. The heat exchanger of claim 8 wherein said collector comprises a plurality of collector legs communicating with and attached to a collector outlet, each said J-pipe and each said straight pipe attached to and communicating with a corresponding said collector leg, said collector outlet extending through a front plate collector aperture, said collector outlet being attached to said front plate at said front plate collector aperture.

10. The heat exchanger of claim 1 wherein said shroud inlet also communicates with said front chamber, whereby a portion of ambient air entering said heat exchanger through said shroud inlet also passes over said at least one said J-pipe and into said front chamber, said ambient air being heated first by said at least one said J-pipe and then by said collector.

11. A heat exchanger comprising a pipe assembly and a shroud, said pipe assembly comprising a front plate and a center plate; a pipe assembly baffle extending rearwards from said center plate; at least one J-pipe attached to and communicating with a collector; said J-pipe passing through and attached to said front plate, said center plate, and said pipe assembly baffle; said collector passing through and attached to said front plate and said center plate; and a center plate vent in said center plate;

said shroud comprising a shroud floor, shroud roof, shroud left wall, shroud right wall, and shroud rear plate; a shroud inlet in said shroud left wall; a shroud outlet in said shroud right wall; front edges of said shroud floor, said shroud roof, said shroud left wall, and said shroud right wall being attached to said front plate, an edge of said shroud back plate opposite said shroud left wall being attached to said pipe assembly baffle.

12. The heat exchanger of claim 11 wherein said front plate, said center plate, said shroud roof, said shroud floor, said shroud left wall, and said shroud right wall define a front chamber; and said center plate, said shroud back plate, said pipe assembly baffle, said shroud roof, said shroud floor, and said shroud left wall define a rear chamber; said front chamber communicating with said rear chamber through said center plate vent.

13. The heat exchanger of claim 12 wherein said collector is attached to said center plate by means of a full-penetration fillet weld.

14. The heat exchanger of claim 13 wherein each said J-pipe extends through said front plate via a corresponding front plate J-pipe aperture and is attached to said front plate by means of a stitch weld.

15. The heat exchanger of claim 14 wherein each said J-pipe extends through said center plate via a corresponding center plate J-pipe aperture and is attached to said center plate by means of a stitch weld.

16. The heat exchanger of claim 12 wherein said shroud back plate is attached to said pipe assembly baffle by means of a shroud baffle, one edge of said shroud baffle being attached to an edge of said shroud back plate opposite said shroud left wall, an opposite edge of said shroud baffle being attached to an edge of said pipe assembly baffle opposite said center plate, said rear chamber being defined by said center plate, said shroud back plate, said shroud baffle, said pipe assembly baffle, said shroud roof, said shroud floor, and said shroud left wall.

17. A heat exchanger comprising a pipe assembly and a shroud, said pipe assembly comprising a front plate and a center plate; a pipe assembly baffle extending rearwards from said center plate; two J-pipes attached to and communicating with a collector; each said J-pipe passing through and attached to said front plate, said center plate, and said pipe assembly baffle; said collector passing through and attached to said front plate and said center plate; two straight pipes attached to and communicating with said collector; and a center plate vent in said center plate;

said shroud comprising a shroud floor, shroud roof, shroud left wall, shroud right wall, front plate, and shroud rear plate; a shroud inlet in said shroud left wall; a shroud outlet in said shroud right wall; front edges of said shroud floor, said shroud roof, said shroud left wall, and said shroud right wall being attached to said front plate, an edge of said shroud back plate opposite said shroud left wall being attached to said pipe assembly baffle, said shroud being sized to slidably admit said pipe assembly.

18. The heat exchanger of claim 17 wherein said front plate, said center plate, said shroud roof, said shroud floor, said shroud left wall, and said shroud right wall define a front chamber; said center plate, said shroud back plate, said pipe assembly baffle, said shroud roof, said shroud floor, and said shroud left wall define a rear chamber; said shroud inlet communicates with said rear chamber; said rear chamber communicates with said front chamber through said center plate vent; and said shroud outlet communicates with said front chamber; whereby ambient air entering said heat exchanger through said shroud inlet is routed around said J-pipes in said rear chamber, through said center plate vent, around said collector in said front chamber, and out of said heat exchanger through said shroud outlet; said ambient air being heated first by said J-pipes and then by said collector; a heat exchange efficiency of said heat exchanger being thus increased by the double heating of said ambient air.

19. The heat exchanger of claim 18 wherein said shroud inlet also communicates with said front chamber, whereby a portion of said ambient air entering said heat exchanger through said shroud inlet also passes around said at least one J-pipe and into said front chamber, said ambient air being heated first by said at least one J-pipe and then by said collector.

20. The heat exchanger of claim 18 wherein said collector is attached to said center plate by means of a full-penetration fillet weld.

* * * * *